United States Patent [19]

Honma et al.

[11] Patent Number: 4,594,267
[45] Date of Patent: Jun. 10, 1986

[54] PROCESS FOR PRODUCING COBALT-CONTAINING MAGNETIC IRON OXIDE POWDER

[75] Inventors: Ichiro Honma, Moriyama; Masaharu Hirai, Shiga; Masatoshi Amano, Moriyama; Nobusuke Takumi, Kusatsu, all of Japan

[73] Assignee: Ishihara Sangyo Kaisha, Ltd., Osaka, Japan

[21] Appl. No.: 715,775

[22] Filed: Mar. 25, 1985

Related U.S. Application Data

[63] Continuation of Ser. No. 557,587, Dec. 2, 1983, abandoned.

[30] Foreign Application Priority Data

Dec. 8, 1982 [JP] Japan ............................ 57-215172

[51] Int. Cl.$^4$ ............................................. C01G 49/06
[52] U.S. Cl. ............................. 427/127; 252/62.56; 427/130; 427/131
[58] Field of Search ............. 427/127, 128, 130, 131; 252/62.56

[56] References Cited

U.S. PATENT DOCUMENTS 4,296,149 10/1981 Rudolf et al. ............... 252/62.56 X
4,414,245 11/1983 Miyazawa et al. .......... 252/62.56 X

FOREIGN PATENT DOCUMENTS 52-36751 9/1977 Japan .
56-10472 8/1981 Japan .
56-48444 11/1981 Japan .
1603213 3/1981 United Kingdom .
2125021 2/1984 United Kingdom .

OTHER PUBLICATIONS

"Switching Field Distribution and A.C. Bias Recording Parameters", by E. Koester et al, *IEEE Transactions on Magnetics*, vol. Mag. 17, No. 6 (Nov. 1981).
"Effect of Switching Field Distributions and Coercivity on Magnetic Recording Properties", by D. M. Wilson, *IEEE Transactions on Magnetics*, vol. Mag-11, No. 5 (Sep. 1975).
"Funtai Oyobi Funmatsu Yakin"(Powder and Powder Metallurgy) vol. 29, vol. 8, pp. 275–279, published Nov. 1982.

*Primary Examiner*—Jack Cooper
*Attorney, Agent, or Firm*—Cushman, Darby & Cushman

[57] ABSTRACT

A cobalt-containing magnetic iron oxide powder is provided by first coating a magnetic iron oxide base powder with a ferrous compound and then coating it with a cobalt compound. The cobalt-containing magnetic iron oxide powder provided is improved in stability of coercivity under aging and various other magnetic properties, and the magnetic tape produced by using the powder is also appreciably improved in stability of coercivity under aging as well as in various magnetic properties such as squareness, orientability and switching field distribution.

4 Claims, No Drawings

PROCESS FOR PRODUCING COBALT-CONTAINING MAGNETIC IRON OXIDE POWDER

CROSS REFERENCE TO RELATED APPLICATIONS

This application is a continuation of our earlier application Ser. No. 557,587 filed Dec. 2, 1983, now abandoned.

BACKGROUND OF THE INVENTION

1. Field of the Invention

This invention relates to a novel process for producing a cobalt-containing magnetic iron oxide powder having an excellent stability of coercivity under aging and also showing excellent magnetic properties such as squareness, orientability and switching field distribution when the powder is used for a magnetic tape.

2. Description of the Prior Art

Because of high coercivity, the magnetic iron oxide powder coated with a cobalt compound has been widely utilized in the field of magnetic recording such as video and audio recording. However, even higher density of the magnetic recording media is in great demand, and further improvements of the properties of such recording media are required.

In order to satisfy these demands, various methods for producing cobalt-containing and ferrous magnetic iron oxide powders have lately been proposed. Among such methods, the following are typical: (1) A cobalt salt solution is added to a water suspension of $\gamma$-$Fe_2O_3$, then an alkali is added thereto to coat the particle surfaces of $\gamma$-$Fe_2O_3$ with a cobalt hydroxide and then an aqueous solution of a ferrous salt is added to said suspension (Japanese Patent Kokoku (Post-Exam. Publn.) No. 48444/81); (2) The method (1) above is carried out under heating (Japanese Patent Kokai (Laid-Open) No. 104721/81); and (3) The $\gamma$-$Fe_2O_3$ particles are dispersed in an aqueous mixed solution of a ferrous salt and a cobalt salt and then an alkali is added thereto to coat the particle surfaces of $\gamma$-$Fe_2O_3$ with ferrous hydroxide and cobalt hydroxide simultaneously (Japanese Patent Kokoku (Post Exam. Publn.) No. 36751/77).

However, the magnetic iron oxide powder obtained according to the above-mentioned method (1) or (2) is unsatisfactory in stability of coercivity under aging, and the magnetic tape made by using such powder is found unsatisfactory not only in stability of coercivity under aging but also in other magnetic properties such as squareness, orientability and switching field distribution. Also, according to the method (3) mentioned above, the epitaxial reaction advances rapidly to invite some serious defects such as reduced stability of coercivity under aging and the broadened distribution of coercivity. Thus, the methods hitherto proposed have room for further improvements.

SUMMARY OF THE INVENTION

The cobalt-containing magnetic iron oxide powder obtained according to the process of this invention is improved in stability of coercivity under aging and various magnetic properties over the products obtained by the conventional methods, and also the magnetic tape produced by using the magnetic iron oxide powder according to this invention is improved not only in stability of coercivity under aging but also in other magnetic properties such as squareness, orientability and switching field distribution.

The process of this invention clearly differs from any of the conventional methods in that a ferrous compound is first coated on the base powder of a magnetic iron oxide and then a cobalt compound is further coated thereon.

Thus, this invention provides a process for producing a cobalt-containing magnetic iron oxide powder characterized in that a ferrous compound is first coated on the base powder of a magnetic iron oxide and then a cobalt compound is further coated thereon.

DETAILED DESCRIPTION OF PREFERRED EMBODIMENTS

As the magnetic iron oxide base powder used in this invention, there may be employed a $\gamma$-$Fe_2O_3$ powder, $Fe_3O_4$ powder, powder of berthollide compound obtained by, for example, partially reducing a $\gamma$-$Fe_2O_3$ powder in a reducing gas such as hydrogen gas, or these powder having phosphorus contained therein which are obtained, for example, by a method in which, during the production of an acicular hydrous iron oxide (such as $\alpha$-, $\beta$- or $\gamma$-FeOOH) which is the precursor of the magnetic iron oxide, a phosphoric acid, such as orthophosphoric acid, metaphosphoric acid, polyphosphoric acid or the like, a phosphorous acid or a water-soluble salt thereof, such as an alkali metal salt or ammonium salt of said acids is introduced into the mother liquor, or by another method in which said acicular hydrous iron oxide or its thermally dehydrated version $\alpha$-$Fe_2O_3$ is coated with said phosphoric or phosphorous acid or a water-soluble salt thereof, with the resulting product being subjected to a pertinent heat treatment. Among them, a phosphorus-containing $\gamma$-$Fe_2O_3$ powder, $Fe_3O_4$ powder and berthollide compound powder are preferred, and the phosphorus-containing $\gamma$-$Fe_2O_3$ powder is most preferred. The phosphorus content in the magnetic iron oxide powder should be usually about 0.1 to 1% by weight.

In the process of this invention, a ferrous compound is first coated on the magnetic iron oxide base powder and then a cobalt compound is coated thereon. Such coating can be accomplished in the various ways such as mentioned below: (1) the magnetic iron oxide base powder is dispersed in an aqueous alkaline solution, and to this dispersion added a ferrous salt, followed by the further addition thereto of a cobalt salt; (2) said powder is dispersed in an aqueous solution containing a ferrous salt, then an aqueous alkaline solution added to this dispersion and then a cobalt salt added; (3) said powder is dispersed in water or a weakly alkaline solution, and to this dispersion are added together an aqueous alkaline solution and a ferrous salt, followed by the further addition of a cobalt salt, or simultaneous addition of a cobalt salt and an aqueous alkaline solution. In these methods, an aqueous alkaline solution may be additionally added as occasion demands.

As the ferrous salt used in the process of this invention, there may be included the ferrous salts or mineral acids such as ferrous sulfate, ferrous nitrate, ferrous chloride and the like, among which ferrous sulfate is preferred for the industrial practice of the process. As the cobalt salt, one may use the inorganic or organic acid salts of cobalt such as cobalt sulfate, cobalt chloride, cobalt acetate and the like, among which cobalt sulfate is preferred for the industrial utilization of the process. As the "alkali", there may be used hydroxides, oxides or carbonates of alkali metals or alkaline earth metals, such as sodium hydroxide, potassium hydroxide, sodium oxide, calcium carbonate and the like, among which sodium hydroxide and potassium hydroxide are preferred for the industrial practice of the process.

The ferrous compound or cobalt compound formed by the salt and the alkali is in the form of a hydroxide, a hydrated oxide, or a mixture thereof. As for the amounts of such ferrous compound and cobalt compound coated, the former is in a range of 0.5 to 30% by weight, preferably 1 to 20% by weight, calculated as Fe, and the latter in a range of 0.1 to 20% by weight, preferably 0.5 to 10% by weight calculated as Co, both based on the total amount of Fe in said magnetic iron oxide base powder.

In practicing the coating operation in accordance with the process of this invention, the suspension slurry of said magnetic iron oxide base powder is adjusted to a concentration of usually 20 to 200 g/l, preferably 50 to 150 g/l, and the coating reaction temperature is controlled usually below the boiling point, preferably below 50° C. Also, the coating operation is usually conducted under a non-oxidizing atmosphere in which the ferrous compound is not substantially oxidized. For making the non-oxidizing atmosphere, for example, the inside atmosphere of the reactor is replaced with an inert gas, or an inert gas is bubbled in the solution in the reactor. The time to be used for the addition of the coating material in the coating operation varies depending on coating methods used, molar concentrations of OH groups, coating reaction temperatures and other conditions, but generally a period of longer than 15 minutes is necessary, and preferably a period of 1 to 2 hours is used. The OH group concentration (concentration of free OH groups more than the neutralization equivalent) in the solution after coating with said ferrous compound or cobalt compound is usually 0 to 3 mol/l, preferably 0.5 to 2 mol/l. The magnetic iron oxide powder which has been coated with a cobalt compound is aged at a temperature usually below the boiling point, for example, below 50° C., in a non-oxidizing atmosphere. In some cases, aging at 50° to 90° C. gives a good effect to the magentic properties of the product. The aging time is usually 0.1 to 10 hours.

In the process of this invention, the coating with a ferrous compound may be immediately followed by the next coating with a cobalt compound, but if necessary, the next cobalt compound coating may be performed after subjecting the ferrous compound-coated powder to a wet heat treatment in a non-oxidizing atmosphere. The ferrous compound subjected to this wet heat treatment is a hydroxide, a hydrated oxide, or a mixture thereof. After coating with a cobalt compound and aging, usually a heat treatment is conducted. This heat treatment can be accomplished in such various ways as mentioned below: (1) the coated slurry is subjected to a wet heat treatment in an autoclave at a temperature of 100° to 250° C., preferably 100° to 200° C.; (2) the coated slurry is filtered and washed with water to form the wet cakes and these wet cakes are again dispersed in water to form a slurry, and then this slurry is subjected to a wet heat treatment in an autoclave at 100° to 250° C., preferably 100° to 200° C.; (3) said wet cakes are heat treated in the presence of water vapor at 60° to 250° C., preferably 60 to 200° C.; (4) said wet cakes are dried at 30° to 200° C.; and (5) said dried product is further subjected to a dry heat treatment at 100° to 300° C., preferably 100° to 200° C. These heat treatments are usually performed under a non-oxidizing atmosphere, but in case that a temperature of heat treatment is low, for example 60° C., so as not to substantially oxidize the ferrous compound, the treatments may be performed under an oxidizing atmosphere.

The cobalt-containing magnetic iron oxide powder obtained according to the process of this invention is improved in stability of coercivity under aging as well as in various magnetic properties, and also the magnetic tape produced by using such iron oxide powder is conspicuously improved not only in stability of coercivity under aging but also in various other magnetic properties such as squareness, orientability and switching field distribution. Furthermore, in the process of this invention, since a very high stability of coercivity under aging is assured, it is very easy to increase the contents of the ferrous compound in the magnetic powder. This can realize a reduction of the transmittancy of intrared rays of the magentic tape which is an important factor at the starting-and-stopping operation of the video home systems (VHS) which lately have come into wide use. This may invite a wider scope of use of the magnetic iron oxide powder.

The reasons for the improvement of the magnetic properties by the process of this invention are not definitely known, but it is surmised that such improvement can be attributed to the following reasons: (1) since a ferrous compound layer and then a cobalt compound layer are formed on the magnetic iron oxide particle surfaces, the diffusion of the cobalt compound into the magnetic iron oxide particles is retarded and at the same time the oxidation of the ferrous compound is discouraged; (2) since a ferrous compound is first coated on the magnetic iron oxide particles, the state of dispersion in the reaction slurry is improved to allow the maintenance of homogeneous conditions in the system during the coating of a cobalt compound, and this facilitates uniform coating of the cobalt compound; (3) when a phosphorus-containing magnetic iron oxide powder is used, the phosphorus contained in the magnetic iron oxide particles acts to inhibit the cobalt compound from being diffused into said particles; (4) since a cobalt compound layer exists as the outermost layer, the cobalt-containing magnetic iron oxide particles have better affinity for the resin in the organic binder.

This invention will be fully understood with reference to the following examples and the comparative examples.

EXAMPLE 1

As the starting material was used $\gamma$-$Fe_2O_3$ with a coercivity (Hc) of 399 Oe and a P content of 0.63% by weight. 100 g of this $\gamma$-$Fe_2O_3$ was dispersed into 1 liter of water and 184 ml of a 10 mol/l NaOH solution to form a slurry. Then, with $N_2$ gas blown into the solution at room temperature (30° C.), 168 ml of a 0.90 mol/l ferrous sulfate solution was added to the slurry and stirred, followed by the further addition of 70 ml of a 0.85 mol/l cobalt sulfate solution, and the resultant slurry was stirred at room temperature (30° C.) for 5 hours. This slurry was filtered and washed with water, and the resultant wet cakes were put into an autoclave along with water kept in a separate container, and after replacing the inside atmosphere with $N_2$ gas, the autoclave was closed and the material therein was subjected to a heat treatment in the presence of water vapor at 130° C. for 6 hours. After this treatment, the treated material was dried in N₂ gas at 120° C. to obtain a cobalt-containing magnetic iron oxide powder (A).

COMPARATIVE EXAMPLE 1

100 g of γ-Fe₂O₃, as used in Example 1, was dispersed in 1 liter of water to form a slurry, and with N₂ gas blown into the solution at room temperature (30° C.), a mixed solution of 168 ml of a 0.90 mol/l ferrous sulfate solution and 70 ml of a 0.85 mol/l cobalt sulfate solution was added to said slurry and stirred, followed by the further addition thereto of 184 ml of a 10 mol/l NaOH solution and stirring of the mixture at room temperature (30° C.) for 5 hours. This slurry was further treated in the same way as in Example 1 to obtain a cobalt-containing magnetic iron oxide powder (B).

COMPARATIVE EXAMPLE 2

100 g of γ-Fe₂O₃, as used in Example 1, was dispersed in 1 liter of water to form a slurry, and while blowing N₂ gas into the solution at room temperature (30° C.), 70 ml of a 0.85 mol/l cobalt sulfate solution was added to said slurry and stirred, followed by the addition of 184 ml of a 10 mol/l NaOH solution and further addition of 168 ml of a 0.90 mol/l ferrous sulfate solution, the resultant slurry being then stirred at room temperature (30° C.) for 5 hours. This slurry was further treated in the same manner as in Example 1 to obtain a cobalt-containing magnetic iron oxide powder (C).

COMPARATIVE EXAMPLE 3

A cobalt-containing magnetic iron oxide powder (D) was obtained in accordance with the same procedures as in Comparative Example 2, except that 56 ml, instead of 70 ml, of the cobalt sulfate solution was used and that 180 ml, instead of 184 ml, of the NaOH solution was used.

The coercivity of each of said samples (A)–(D) was measured by an ordinary method, and furthermore the change of coercivity with time (ΔHc) was determined from the following calculation formula:

Change of coercivity with time (ΔHc)=(coercivity (Hc) after 14-day standing at 60° C. and 80% RH)−(initial coercivity (Hc))

The results are shown in Table 1.

Then, by using each of said samples (A)–(D), a blend was prepared according to the following recipe and the blend was milled by a ball mill to produce a magnetic coating material.

| Blend | | |
|---|---|---|
| (1) | cobalt-containing magnetic iron oxide powder | 24 parts by weight |
| (2) | polyurethane resin | 5 parts by weight |

| -continued | | |
|---|---|---|
| Blend | | |
| (3) | vinyl chloride-vinyl acetate copolymer | 1.2 parts by weight |
| (4) | dispersing agent | 0.5 parts by weight |
| (5) | mixed solvent (toluene/MEK = 1/1) | 69.5 parts by weight |

Then, each of the magnetic coating materials was applied on a polyester film, orientated and dried in the usual way to make a magnetic tape having an approximately 9 micron thick magnetic coating film, and the coercivity (Hc), maximum induction (Bm), squareness (Br/Bm), orientability (OR) and switching field distribution (SFD) of each of the produced magnetic tapes were measured by the known methods. The results are shown in Table 1.

TABLE 1

| | Samples | Magnetic properties of powder | | Measurements on tape | | | | |
|---|---|---|---|---|---|---|---|---|
| | | Coercivity Hc (Oe) | ΔHc (Oe) | Hc (Oe) | Bm (Gauss) | Br/Bm | OR | SFD |
| Example 1 | A | 648 | −1 | 670 | 1521 | 0.77 | 1.85 | 0.45 |
| Comp. Example 1 | B | 662 | −33 | 698 | 1524 | 0.75 | 1.66 | 0.48 |
| Comp. Example 2 | C | 738 | −45 | 768 | 1594 | 0.73 | 1.61 | 0.52 |
| Comp. Example 3 | D | 671 | −20 | 708 | 1551 | 0.75 | 1.57 | 0.61 |

EXAMPLE 2

100 g of γ-Fe₂O₃, as used in Example 1, was dispersed into 1 liter of water to form a slurry, and with N₂ gas blown into the solution at room temperature (30° C.), 168 ml of a 0.90 mol/l ferrous sulfate solution was added to said slurry, followed by the addition of 184 ml of a 10 mol/l NaOH solution and stirring and further addition of 70 ml of a 0.85 mol/l cobalt sulfate solution, the resultant slurry being stirred at room temperature (30° C.) for 5 hours. Thereafter, the same treatment as in Example 1 was conducted to obtain a cobalt-containing magnetic iron oxide powder (E).

EXAMPLE 3

Another cobalt-containing magnetic iron oxide powder (F) was obtained in the same way as in Example 2, except that the stirring at room temperature (30° C.) for 5 hours was replaced with the stirring at 90° C. for 5 hours.

COMPARATIVE EXAMPLE 4

A cobalt-containing magnetic iron oxide powder (G) was obtained in the same way as in Comparative Example 1, except that the stirring at room temperature (30° C.) for 5 hours was replaced with the stirring at 90° C. for 5 hours.

The coercivity of each of said samples (E)–(G) was measured in the usual way, and also the change of coercivity with time (ΔHc) of each of said samples was determined in the above-described way. The results are shown in Table 2.

Furthermore, by using each of said samples (E)–(G), a magnetic tape was produced by the same method as mentioned above, and the coercivity (Hc), maximum induction (Bm), squareness (Br/Bm), orientability (OR) and switching field distribution (SFD) of each tape were determined in the usual ways, the results being shown in Table 2.

and (I) in the above-mentioned ways. The results are shown in Table 3.

TABLE 2

| | Samples | Magnetic properties of powder | | Measurements on tape | | | | |
|---|---|---|---|---|---|---|---|---|
| | | Coercivity Hc (Oe) | ΔHc (Oe) | Hc (Oe) | Bm (Gauss) | Br/Bm | OR | SFD |
| Example 2 | E | 585 | +4 | 602 | 1522 | 0.79 | 1.97 | 0.42 |
| Example 3 | F | 639 | +15 | 674 | 1430 | 0.81 | 1.87 | 0.44 |
| Comp. Example 4 | G | 555 | −19 | 631 | 1461 | 0.77 | 1.90 | 0.60 |

EXAMPLE 4

As the starting material was used $\gamma$-$Fe_2O_3$ with a coercivity (Hc) of 434 Oe and a P content of 0.55% by weight. 100 g of said $\gamma$-$Fe_2O_3$ was dispersed into 1 liter of water to form a slurry, and with $N_2$ gas blown into the solution at room temperature (30° C.), 140 ml of a 0.90 mol/l ferrous sulfate solution and then 155 ml of a 10 mol/l NaOH solution were added to the slurry and stirred. This slurry was put into an autoclave, and after replacing the inside atmosphere with $N_2$ gas, the material in the autoclave was subjected to a wet heat treatment at 100° C. for one hour. After this reaction, the slurry was filtered and washed with water and the thus obtained wet cakes were dispersed into 1 liter of water to again form a slurry. To this slurry was added 132 ml of a 10 mol/l NaOH solution, followed by the further addition of 70 ml of a 0.85 mol/l cobalt sulfate solution while blowing $N_2$ gas into the solution at room temperature (30° C.), and the resultant slurry was stirred at room temperature (30° C.) for 3 hours. This slurry was filtered and washed with water, and the thus formed wet cakes were put into an autoclave together with water kept in a separate container, and after replacement with $N_2$ gas and closure of the autoclave, the cakes therein were heat treated in the presence of water vapor at 120° C. for 6 hours. After this treatment, the product was dried at 60° C. to obtain a cobalt-containing magnetic iron oxide powder (H).

COMPARATIVE EXAMPLE 5

100 g of $\gamma$-$Fe_2O_3$, as used in Example 4, was dispersed into 1 liter of water to form a slurry, to which 176 ml of a 10 mol/l NaOH solution was added, followed by the further addition of a mixed solution consisting of 140 ml of a 0.90 mol/l ferrous sulfate solution and 70 ml of a 0.85 mol/l cobalt sulfate solution while blowing $N_2$ gas into the solution at room temperature (30° C.), and the mixture was stirred at room temperature (30° C.) for 3 hours. This slurry was filtered and washed with water to obtain the wet cakes, which were treated after the manner of Example 4 to obtain a cobalt-containing magnetic iron oxide powder (I).

The coercivity and the change of coercivity with time (ΔHc) were measured on each of said samples (H)

Also, the magnetic tapes were produced in said way by using said respective samples, and their coercivity (Hc), maximum induction (Bm), squareness (Br/Bm), orientability (OR) and switching field distribution (SFD) were determined by the known methods. The results are shown in Table 3.

TABLE 3

| | Samples | Magnetic properties of powder | | Measurements on tape | | | | |
|---|---|---|---|---|---|---|---|---|
| | | Coercivity Hc (Oe) | ΔHc (Oe) | Hc (Oe) | Bm (Gauss) | Br/Bm | OR | SFD |
| Example 4 | H | 627 | −3 | 658 | 1344 | 0.85 | 2.47 | 0.40 |
| Comp. Example 5 | I | 603 | +14 | 648 | 1361 | 0.84 | 2.14 | 0.45 |

EXAMPLE 5

100 g of $\gamma$-$Fe_2O_3$ having a coercivity (Hc) of 317 Oe and a P content of 0.34% by weight was dispersed into 1 liter of water and 176 ml of a 10 mol/l NaOH solution to form a slurry, and with $N_2$ gas blown into the slurry at room temperature (30° C.), 140 ml of a 0.90 mol/l ferrous sulfate solution was added to said slurry and stirred, followed by the further addition of 70 ml of a 0.85 mol/l cobalt sulfate solution, the resultant slurry being stirred at room temperature (30° C.) for 5 hours. This slurry was filtered and washed with water to form the wet cakes, which were dried in $N_2$ gas at 120° C. to obtain a cobalt-containing magnetic iron oxide powder (J).

COMPARATIVE EXAMPLE 6

100 g of $\gamma$-$Fe_2O_3$, as used in Example 5 was dispersed into 1 liter of water to form a slurry, and while blowing $N_2$ gas into the solution at room temperature (30° C.), a mixed solution of 140 ml of a 0.90 mol/l ferrous sulfate solution and 70 ml of a 0.85 mol/l cobalt sulfate solution was added to the slurry and stirred, followed by the addition of 176 ml of a 10 mol/l NaOH solution and stirring of the mixture at room temperature (30° C.) for 5 hours. The rest of the operation was conducted in accordance with the same procedures as in Example 5 to obtain a cobalt-containing magnetic iron oxide powder (K).

The coercivity of each of said samples (J) and (K) was measured in the usual way. The change of coercivity with time (ΔHc) was also determined by the above-mentioned method. The results are shown in Table 4. Furthermore, by using each of said samples, a blend was prepared according to the following formulation and the blend was milled by a ball mill to produce a magnetic coating material.

| Blend | | |
|---|---|---|
| (1) | cobalt-containing magnetic iron oxide powder | 29.0 parts by weight |
| (2) | polyurethane resin | 3.0 parts by weight |
| (3) | vinyl chloride-vinyl acetate copolymer | 3.4 parts by weight |
| (4) | dispersing agent | 1.2 parts by weight |
| (5) | mixed solvent (toluene/MEK/cyclohexanon = 3/3/1) | 63.4 parts by weight |

Then each of the thus produced magnetic coating materials was applied on a polyester film, orientated and dried in the ordinary ways to make a magnetic tape having an approximately 9 micron thick magnetic coating film. The coercivity (Hc), maximum induction (Bm), squareness (Br/Bm), orientability (OR) and switching field distribution (SFD) of each of the magnetic tapes were determined by the ordinary methods. The results are shown in Table 4.

TABLE 4

| | | Magnetic properties of powder | | Measurements on tape | | | | |
|---|---|---|---|---|---|---|---|---|
| | Samples | Coercivity Hc (Oe) | ΔHc (Oe) | Hc (Oe) | Bm (Gauss) | Br/Bm | OR | SFD |
| Example 5 | J | 512 | +8 | 556 | 1306 | 0.75 | 1.66 | 0.54 |
| Comp. Example 6 | K | 520 | −16 | 563 | 1424 | 0.74 | 1.54 | 0.62 |

What is claimed is:

1. A process for producing a cobalt-containing magnetic iron oxide powder having improved stability of coercivity under aging by coating a ferrous compound and a cobalt compound on the surface of particles of a base powder of acicular magnetic gamma-$Fe_2O_3$ powder, $Fe_{O4}$ powder or powder of a berthollide compound obtained by partially reducing $\gamma$-$Fe_2O_3$, said base powder containing 0.1 to 1% by weight of phosphorus, which process comprises the successive steps of:

(1) preparing an aqueous slurry of said particles of base powder;

(2) coating a ferrous compound on the surface of said particles of lease powder by reacting a ferrous salt with an alkali;

(3) coating a cobalt compound on the surface of the first coated particles by reacting a cobalt salt with an alkali;

wherein both steps are carried out so that the OH group concentration of the slurry of steps (2) and (3) containing the ferrous compound-coated particles or the cobalt compound-coated particles is within the range of 0 to 3 mol/l the coating steps being carried out at a temperature below the boiling point, and in a non-oxidizing atmosphere;

(4) filtering the slurry of coated particles resulting from step (3) to form a wet cake;

(5) washing the wet cake; and then (6) heat-treating the wet cake at a temperature of 30° C. to 200° C. to dry the cake, said cobalt containing magnetic iron oxide exhibiting a smaller change of coercivity with time than the corresponding cobalt containing magnetic iron oxide prepared as above but where the sequence of steps (2) and (3) is reversed.

2. The process according to claim 1, wherein the ferrous compound coated in step (2) is a hydroxide, a hydrated oxide, or a mixture thereof.

3. The process according to claim 1, wherein coating steps (2) and (3) are carried out so that the OH group concentration of the slurry containing the ferrous compound-coated particles or the cobalt compound-coated particles is within a range of 0.5 to 2 mol/l.

4. The process according to claim 1, wherein coating steps (2) and (3) are carried out at a temperature below 50° C.

* * * * *